United States Patent [19]
Nelson et al.

[11] 3,752,569
[45] Aug. 14, 1973

[54] PROJECTOR MECHANISM
[75] Inventors: Edward J. Nelson; Ilo M. Brown, both of Omaha, Nebr.
[73] Assignee: Ballantyne of Omaha, Inc., Omaha, Nebr.
[22] Filed: Oct. 29, 1971
[21] Appl. No.: 193,917

[52] U.S. Cl.................. 352/139, 350/252, 350/255, 350/257, 352/231
[51] Int. Cl. ............................................ G03b 3/00
[58] Field of Search............................ 352/231, 139; 350/252, 255, 256, 257

[56] References Cited
UNITED STATES PATENTS

| | | | |
|---|---|---|---|
| 2,756,628 | 7/1956 | Lang................................... | 352/231 |
| 3,476,476 | 11/1969 | Chitayat............................. | 355/53 X |
| 2,818,768 | 1/1958 | Updegraff.......................... | 350/252 X |
| 2,373,052 | 4/1945 | Rausch .............................. | 352/231 |
| 1,879,737 | 9/1932 | DelRiccio ......................... | 350/255 X |

Primary Examiner—Samuel S. Matthews
Assistant Examiner—Monroe H. Hayes
Attorney—Seymour Rothstein et al.

[57] ABSTRACT

Motion picture projector mechanism having means a support for the film for movement through the projector mechanism in both a forward and a reverse direction, the support including spaced-apart guides for retaining the film curved in cross-section (convex relative to the light source) over a substantial length to rigidify the film for both forward and reverse movement. The support includes a film gate and film trap that can be removed as an assembly, eliminating the necessity of adjustment to keep the film gate in perfect alignment to the film trap. The film gate can readily be removed from the assembly for cleaning, with provision being made to adjust the film shoe tension while the projector mechanism is operative. The lens holder mechanism is designed to accept different diameter lenses so as to provide for cinemascopic and wide screen viewing and provides prefocusing of such lenses. It is mounted on a double V-slide and has a microlens focus adjustment.

4 Claims, 26 Drawing Figures

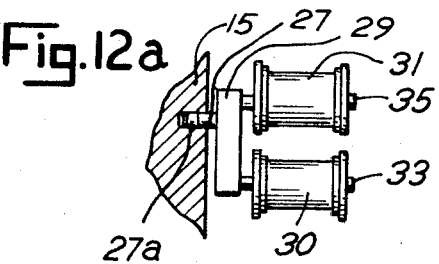
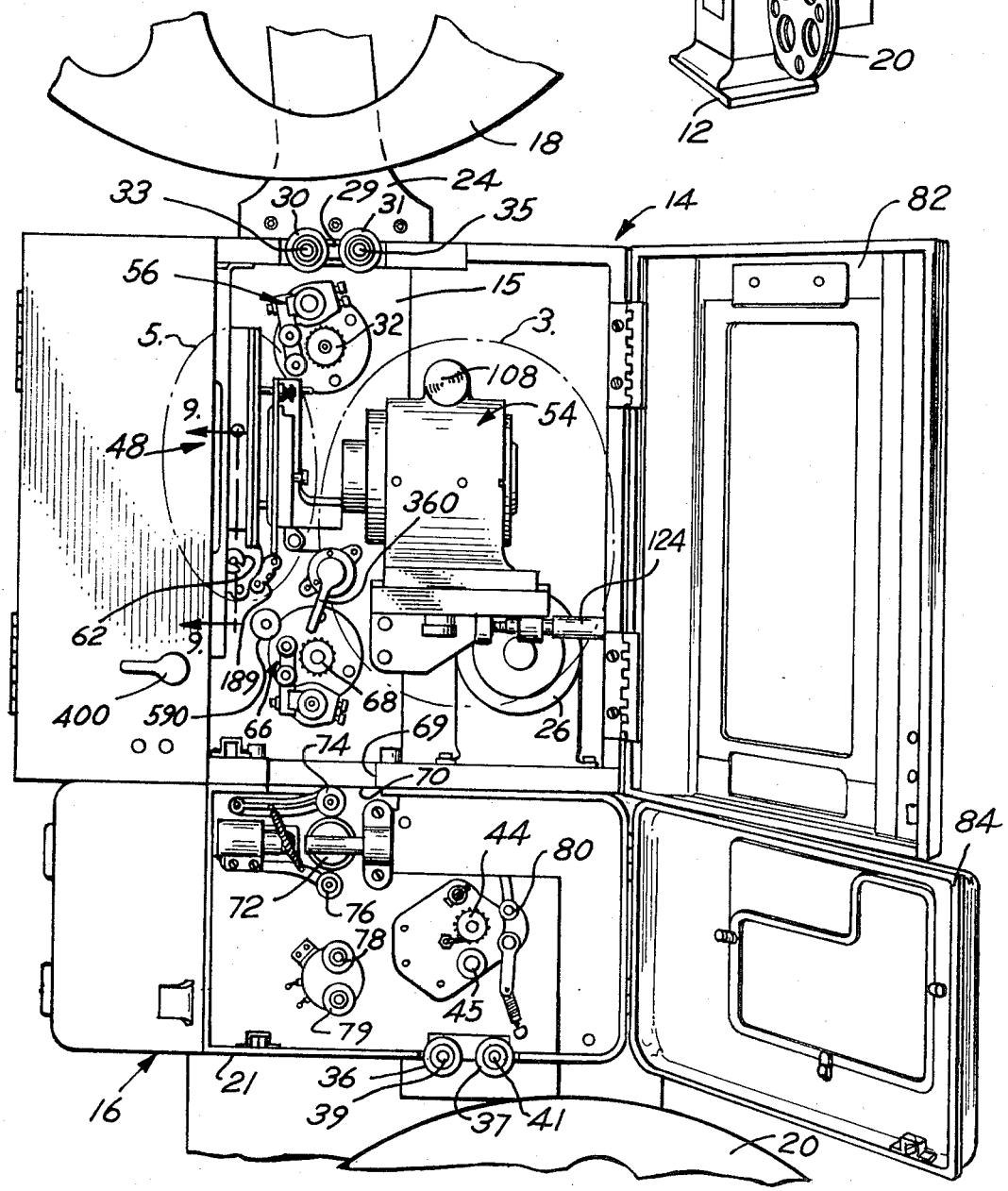

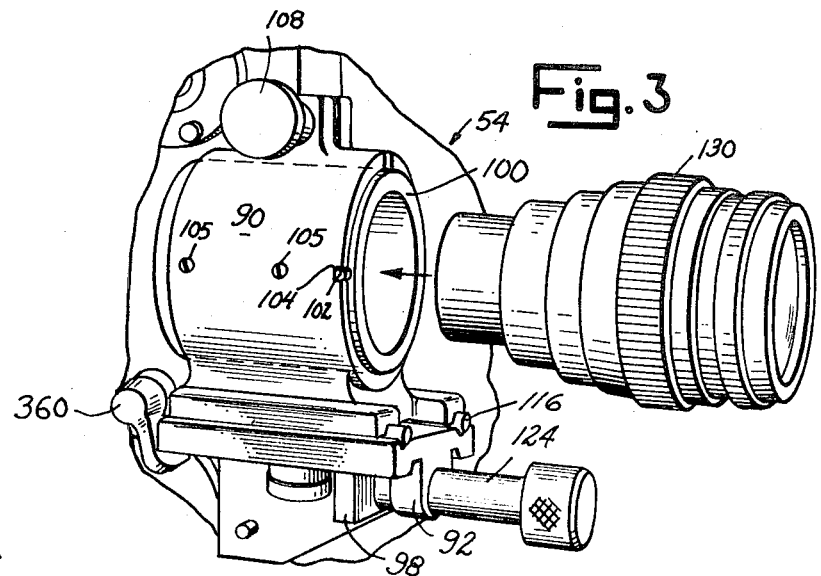
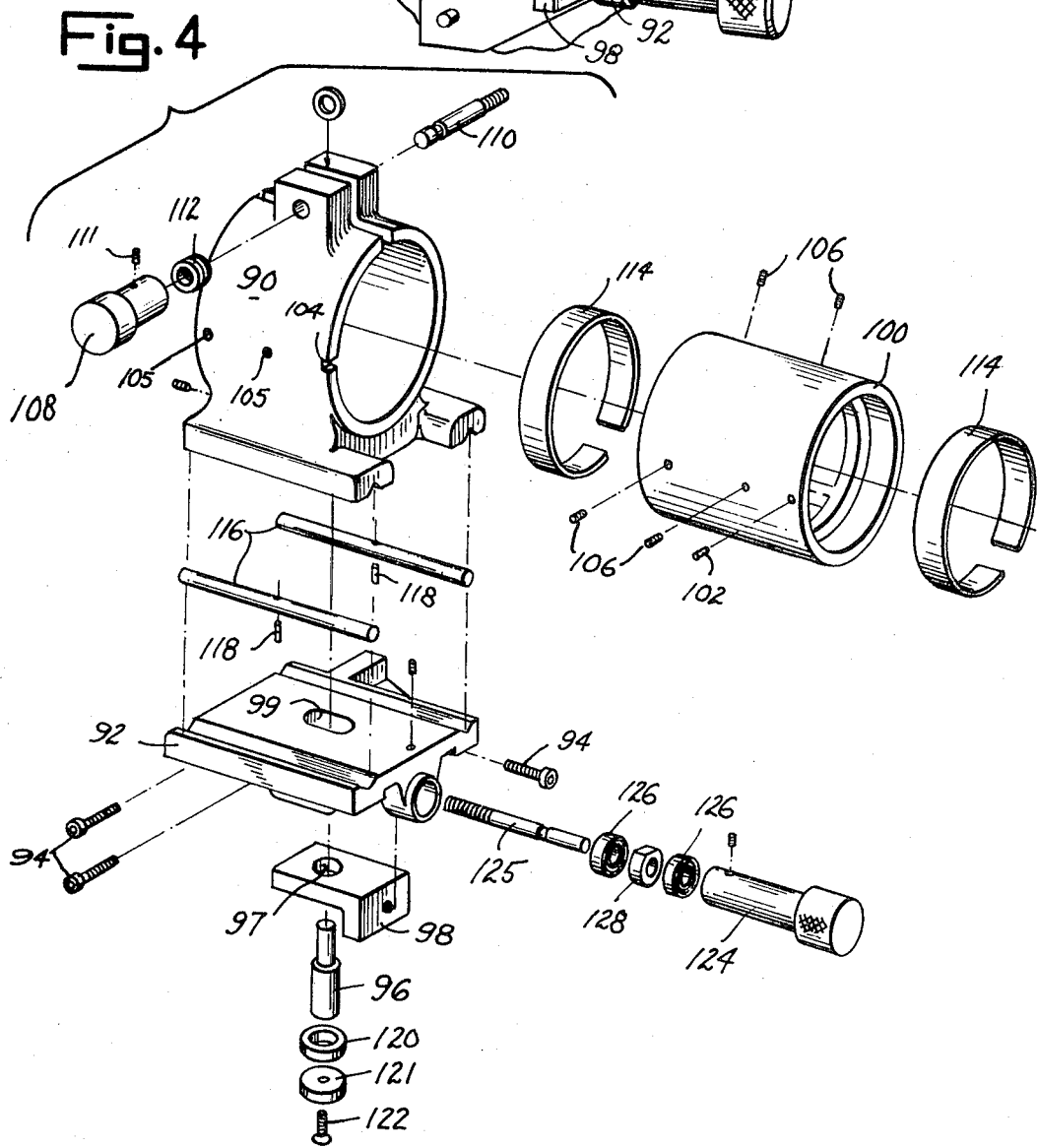

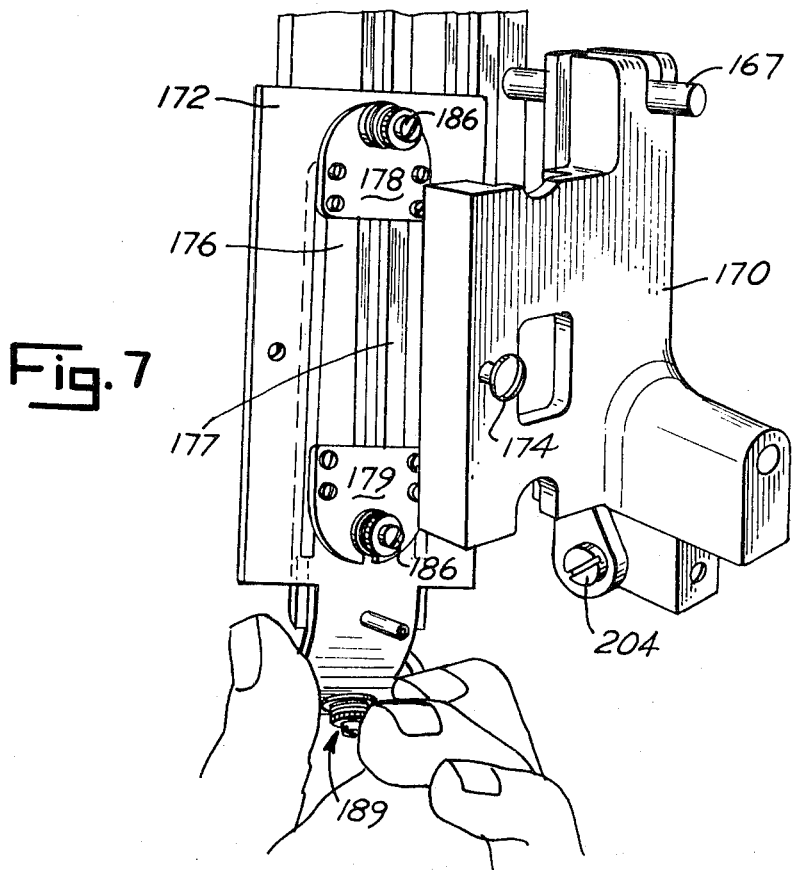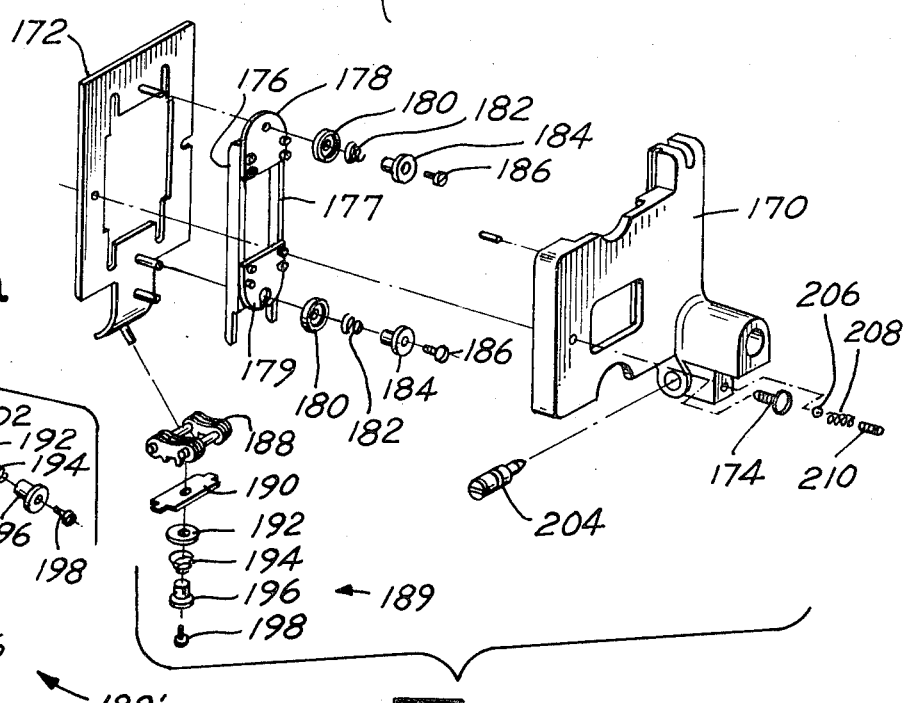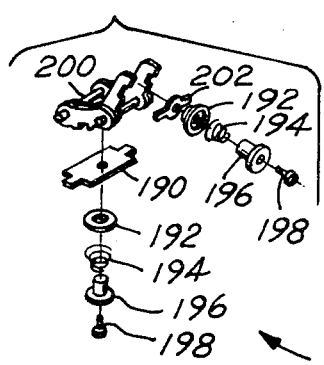

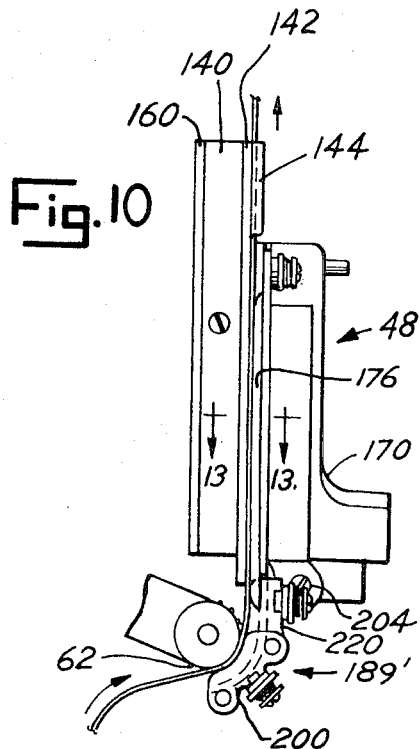
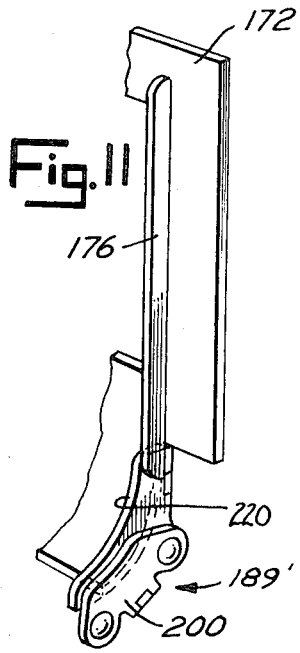
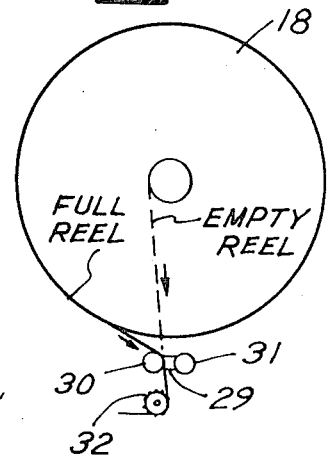
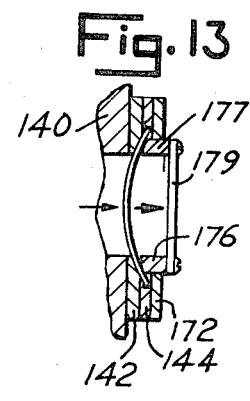
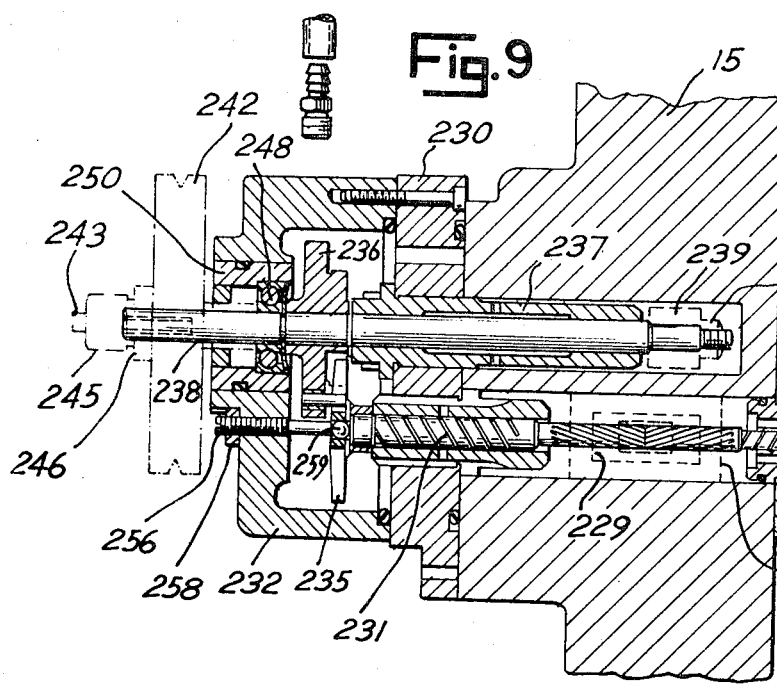

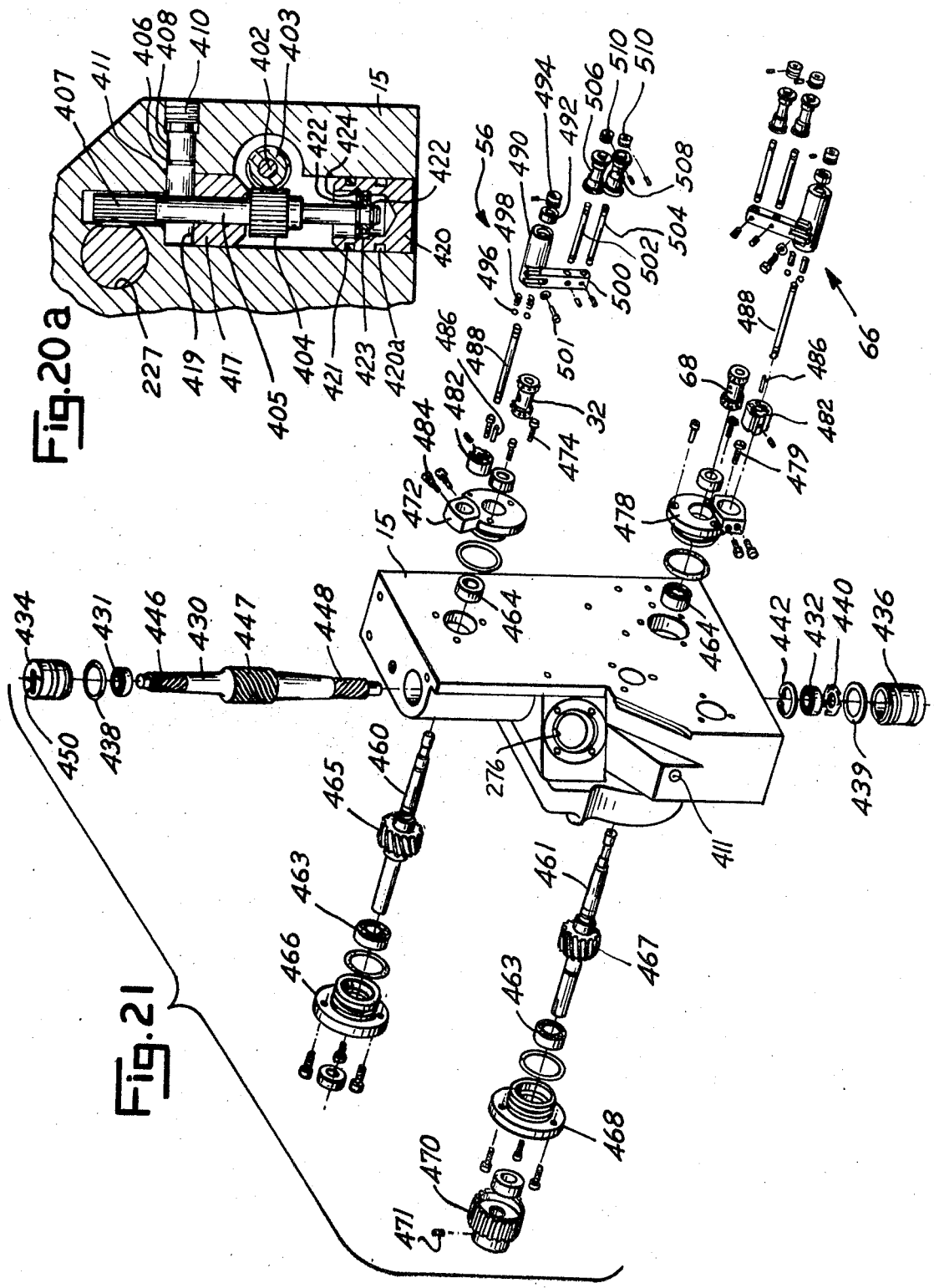

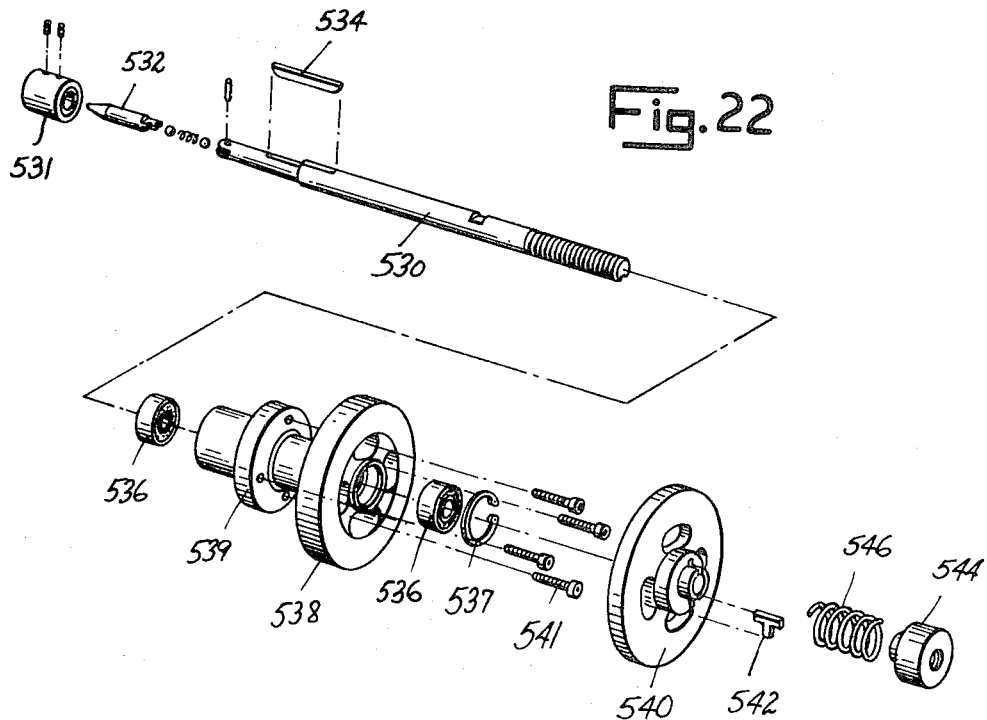
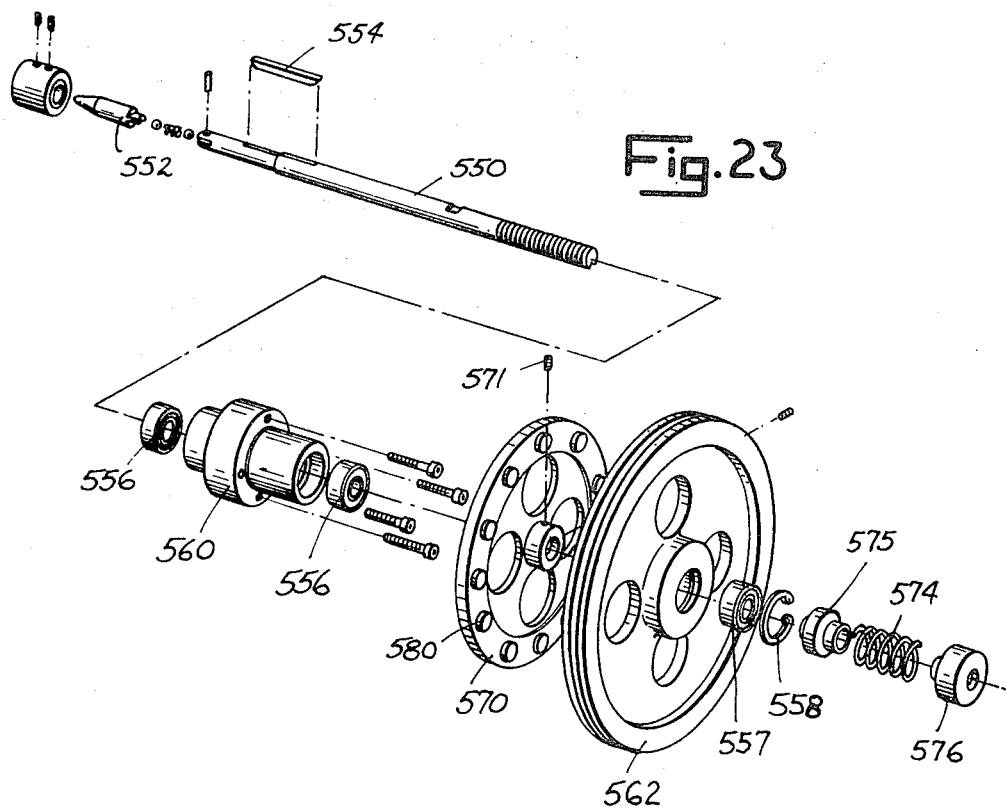

PROJECTOR MECHANISM

BACKGROUND OF THE INVENTION

The present invention relates to a projector mechanism, and more particularly to an improved motion picture projector incorporating a film gate and trap curved to match the curvature of the screen, with a lens holder provided with complete prefocusing facilities, and with the film gate and trap made as an assembly that can be removed as an assembly, eliminating the necessity of adjustment to keep the gate in alignment with the trap.

Motion picture projection in a theater is commonly provided by a pair of commercial or professional projector systems operable in tandem. Each system includes a projector and a sound mechanism. Reels containing film are placed on each of the projectors and the projectors are operated sequentially so as to provide continuous motion picture viewing enjoyment for an audience. Typically, the 35mm motion picture projectors used are generally complex, have many parts, and are quite bulky.

A principal object of the present invention is to provide a novel motion picture projector mechanism featuring simplicity and containing substantially fewer parts than prior professional motion picture projectors.

Another object of the present invention is to provide an improved projector mechanism incorporating a film gate and trap curved to match the curvature of a picture screen.

Another object of the present invention is to provide an improved projector mechanism having a lens holder designed to accept different diameter lenses with complete prefocusing facilities.

Still another object of the present invention is to provide an improved projector mechanism wherein the film gate and trap are made as an assembly such that they can be removed as an assembly, eliminating the need of adjustment to keep the gate in perfect alignment to the trap.

Another object of this invention is to provide an improved projector mechanism having a film gate that is part of the trap assembly, yet constructing the gate so that it can easily be removed by means of one screw for ease in cleaning.

It is yet another object of the present invention to provide an improved projector mechanism having film shoes in the film gate that can be adjusted for tension while the film is being run, with the opening and closing mechanism for the film gate being adjustable while the film is running for exact distance and tension of the gate on the trap in order to provide for optimum running of the film through the projector mechanism.

It is yet another object of this invention to provide an improved projector mechanism incorporating a ball bearing supported outboard intermittent sprocket shaft.

Still another object of this invention is to provide an improved projector mechanism incorporating a unique framing arrangement wherein framing is accomplished by turning the intermittent sprocket with a plastic spiral coupling completely free from the shutter such that no shutter compensation is needed when the picture is framed, the framing arrangement eliminating adjustment knobs and compensating mechanism to remove travel ghost from the screen.

Still a further object of the present invention is to provide an improved projector mechanism incorporating a unique conical shutter positioned close to the aperture for maximum light efficiency. Other objects and advantages of the present invention will be made more apparent hereafter.

BRIEF DESCRIPTION OF THE DRAWING

There is shown in the attached drawing a presently preferred embodiment of the present invention wherein like numerals in the different views refer to like elements and wherein:

FIG. 1 is a perspective view of a projector system embodying the projector mechanism of the present invention;

FIG. 2 is a side view of the projector system of FIG. 1 with the covers open to better illustrate the components thereof;

FIG. 3 is a perspective view of the lens construction (shown generally in the circled area identified by the numeral 3 in FIG. 2);

FIG. 4 is an exploded perspective view of the lens construction;

FIG. 7 is a perspective view of the film trap cover assembly illustrating removal of the gate shoe;

FIG. 8 is an exploded perspective view of the film trap cover assembly;

FIG. 8a is a detail exploded perspective view of the intermittent sprocket tension shoe assembly modification for reverse projection;

FIG. 9 is a cross-sectional view taken generally along line 9—9 of FIG. 2 illustrating the intermittent movement and the outboard bearing mounting for the intermittent sprocket shaft;

FIG. 10 is a detail side elevation view of the projector mechanism, illustrating the film trap and film gate assembly and showing the cooperation between the gate shoe and the intermittent shoe;

FIG. 11 is a detail perspective view better illustrating the cooperation between the intermittent shoe and the gate shoe during reverse operation of the film through the motion picture projector mechanism;

FIG. 12 is an elevation view somewhat schematicized of the film guide rollers associated with a reel;

FIG. 12a is a detail plan view of the film guide rollers for the upper reel;

FIG. 13 is a detail cross-sectional view taken generally along the line 13—13 of FIG. 10 and illustrating the curvature of the film as it passes through the projector mechanism;

FIG. 20a is a detail cross-sectional view illustrating the cooperation between the vertical framing shaft and intermittent movement, and also showing the friction means for retaining the vertical shaft in adjusted position;

FIG. 21 is a detail perspective view of the vertical shaft assembly and the upper and lower horizontal shaft assemblies;

FIG. 22 is a detail perspective view of the reel holdback clutch assembly;

FIG. 23 is an exploded perspective view of the lower take-up assembly.

DESCRIPTION OF THE PREFERRED EMBODIMENT

Figure 5:
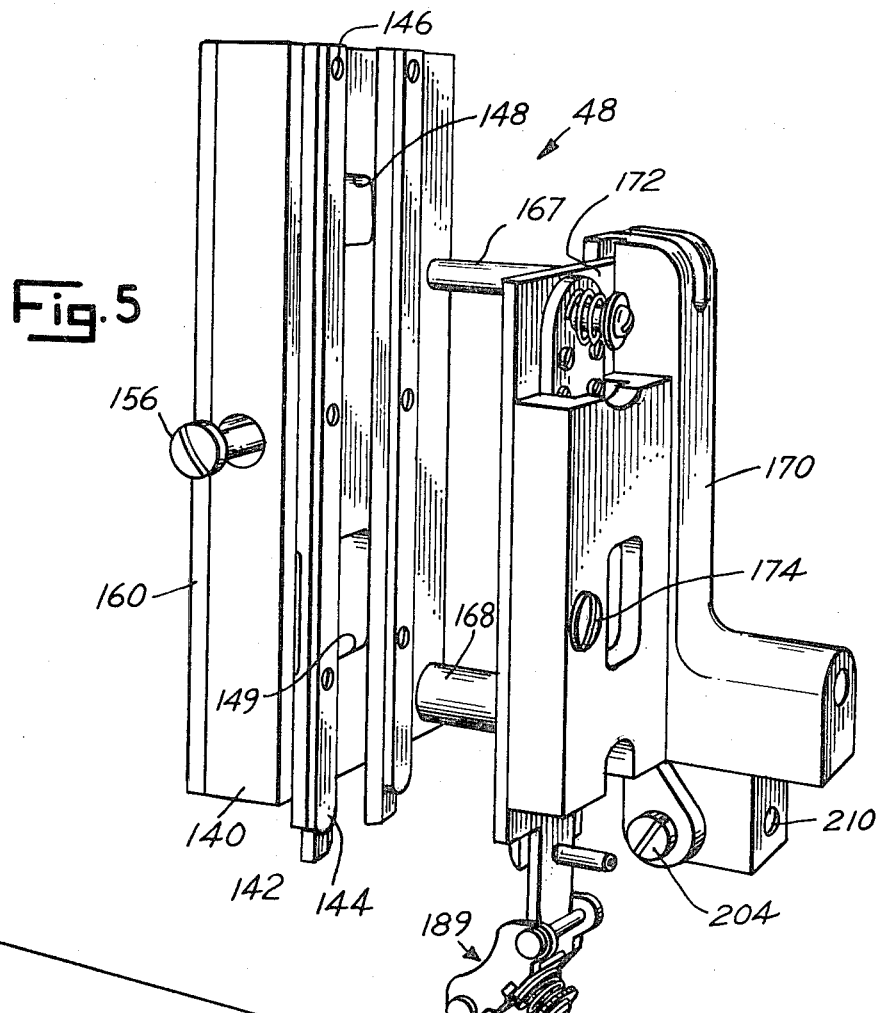
FIG. 5 is a perspective view of the film trap and film gate assembly (shown generally in the circled area identified by numeral 5 in FIG. 2) with the film gate moved away from operative position relative to the film trap.
Figure 6:
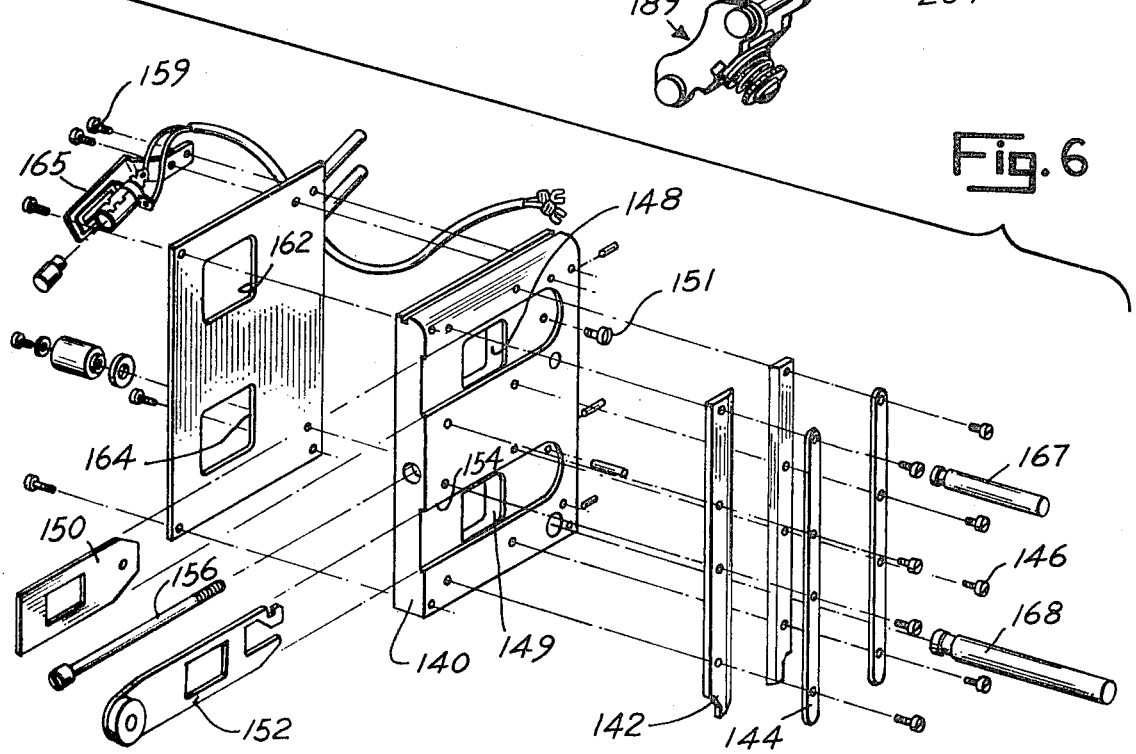
FIG. 6 is a perspective exploded view of the film trap assembly.

Referring now to FIG. 1, there is illustrated a professional motion picture projector system 10 embodying the present invention. The projector system 10 includes a pedestal 12 having supported thereon projection mechanism 14 and sound mechanism 16. Reels 18 and 20 are carried on suitable support such that film may be transported from the reel 18 through the projector mechanism 14 and sound mechanism 16 onto the take-up reel 20. Just before the end of the reel or just prior to the time the film is about to leave the reel 18, the projector mechanism 14 will be actuated to stop and initiate operation of a companion mechanism in the instance where the two projectors are operated in tandem in the motion picture theater. The first projector will then automatically reverse and the film will be rewound through the projector and taken back onto the reel 18 from the reel 20. It will be evident from the foregoing brief description that the motion picture projector system 10 of the present invention can be readily adapted for a new type theater incorporating automated projector mechanism for showing and then rewinding a film. By virtue of its unique design, the projector mechanism of this invention can also be used singly, without the automation features to which it is easily adapted.

Turning to FIG. 2, there is better illustrated the constructional relationship between the components of the motion picture projector system 10. Projector mechanism 14 is mounted on the frame 21 of sound mechanism 16. The frame 21 is secured at its rear to the pedestal 12 by suitable fastening means, for example, hex head screws and washers. The drive housing or magazine 17 is secured to the projector mechanism 14 and sound mechanism 16, and is disposed below projector mechanism 14. The reel 20 is secured on the lower take-up arm mounted from the housing 17 and reel 18 is mounted on upper reel arm 24 connected to the projector 14. A conventional light source, for example, a carbon arc lamp or a xenon lamp may be carried on the pedestal 12 rearwardly of the projector mechanism 14 to project light through the film trap and film gate assembly 48 and lens assembly 54.

Drive means 26 comprising an electric drive motor are provided in the projector 14 and operatively connected by suitable belt means to drive the intermittent movement, the projector mechanism, the take-up arm and the sound mechanism. Preferably, motor 26 is a reversible 1/15 horsepower motor.

A feature of the present invention is the use of guide rollers to help compensate for large differences in effective diameter of film on reel 18 and to guide film to the top sprocket 32 to avoid damage to the film. The rollers 30, 31 (FIGS. 2, 12, and 12a) are journalled on shafts 33, 35, which are supported on a bracket 29 pivoted to the main frame 15. The pivot shaft 27 for bracket 29 is offset from the center of the axis of the shafts 33, 35 supporting the rollers 30, 31, and is axially adjustable inwards and outwards relative to the main frame 15 to align the rollers 30, 31 with the sprocket 32 and reel 18. The pivot shaft 27 is held in adjusted position by a set screw that passes through an opening in main frame 15 into engagement with recess 27a in the shaft 27. By virtue of the pivot construction of the support for the rollers 30, 31, the flanges of the rollers can be positioned so that they will remain in guided engagement with the film to prevent lateral film movement both during forward and reverse operation. The rollers 36, 37 are journalled on shafts 39 and 41, which are fixed in position. The shafts 39, 41 are adjustable for alignment with reel 20 and sprocket 44 and idler 45 in the sound mechanism 16. Adjustment of the shafts 39 and 41 may be made by loosening set screws extending through the frame means 15 of the projector 14 into engagement with each shaft, and moving the shaft (and rollers carried therewith) in or out with respect to frame means 15. Then each set screw is tightened to lock the shafts in adjusted position.

Another feature of this invention is the construction of the film trap and film gate assembly 48, which will be explained in more detail later. The film trap and film gate assembly 48 suitably supports the film between the light source (not shown) contained in the portion 50 of the housing for projector 14 and the lens mount assembly 54, which is of a unique construction and will be covered in more detail hereafter.

The overall function of the projector system will be described and then the constructional aspects of the invention will be considered. After the projector system is assembled, as shown for example in FIG. 1, an empty reel 20 is positioned on the take-up arm and a full reel is positioned on the upper reel arm 24. Film is threaded through the guide rollers 30, 31, over upper sprocket 32 and through the film trap and film gate assembly 48. Retainer means 56 comprising double pad rollers mounted on an arm pivoted on a transverse shaft secured to frame 15 cooperates with the film to hold same in engagement with the teeth of top sprocket 32. The film from the film trap and film gate assembly 48 passes between the intermittent sprocket 62 and intermittent shoe 189 between cooperating retainer means 66 and sprocket 68 and then exits the projector 14 through the opening 69 formed in the base of the frame means 15. The film enters the sound mechanism through an opening 70 in frame 21 that is aligned with opening 69 and is held in contact with sound drum 72 by means of cooperating rollers 74 and 76. The film is threaded over rollers 78, 79, between sprocket 44 and retainer roller 80, over idler 45 and through guide rollers 36, 37 and is then connected at its lead end to the reel 20.

Assuming that the lens assembly 54 has been focused, the cover 82 on the projector 14 and the cover 84 on the sound mechanism 18 may be closed. The projector system 10 may be operated to show a complete film on reel 18 or it can be operated in association with a second projector system to show a reel on one projector and then automatically stop the first projector system and start the second projector system at the end of the first reel. The control circuitry may be adapted to automatically reverse operation of the first projector system to rewind the film onto reel 18 upon initiation of operation of the second projector system.

The lens mount assembly 54, as best shown in FIGS. 3 and 4, is designed for instant change lens holder and is anchored to the main frame by removable fastening means to permit easy removal and replacement with a turret or horizontal lens mount assembly. The lens mount assembly is of rigid construction to eliminate deflection or vibration thereof in use. The lens mount assembly 54 is comprised of a lens holder 90 slidably supported on a lens mount arm 92 that is connected to main frame 15 by screw means 94. The lens holder 90 is preferably made from cast iron to have a minimum expansion coefficient so that the high temperature from the light beam will not affect it. Lens mount stud 96 extends through complementary opening 97 in focus bracket 98, slotted opening 99 in arm 92 and engages lens holder 90. Lens adapter 100 is adapted to be positioned within the lens holder 90, with pin 102 engaged in slot or recess 104. Pairs of openings 105 in the lens holder 90 are aligned with pairs of set screws 106 secured to the lens adapter 100. Preferably, there are multiple cooperating pairs of aligned openings 105 and set screws 106.

The lens holder knob 108 is connected to the lens clamp shaft 110 by set screw 111 and it will be understood that rotation of the knob 108 in one direction will draw the upstanding projections of the lens holder 90 toward one another to clamp the adapter 100 in place. Reverse rotation of the knob 108 will release the adapter. Thrust bearing 112 is between the knob 108, shaft 110, and projection of lens holder 90. The lens adapter pressure rings 114 are received in the ends of the adapter 100.

The focusing arrangement includes like elongated cylindrical pins 116 disposed in cooperating V-slots in the adjacent surfaces of the base plate or arm 92 and the lens holder 90. Fasteners 118 retain the pins 116 in fixed position. Drag washer 120 and stud washer 121 are held in place by cap screw 122 connected to a threaded opening in the mount stud 96. Lens mount knob 124 is connected to focus screw 125 that is threadedly connected to an opening in focus bracket 98. Rotation of the knob 124 and shaft or screw 125 secured thereto will move bracket 98 and lens holder 90 relative to mount arm 92. Bearings 126 and spacer 128 are provided on shaft 125 between the knob 124 and mount arm 92.

The lens mount assembly 54 is adapted to be used with anamorphic and wide screen lenses. A first lens 130 is inserted into an associated lens adapter 100 and the adapter 100 is inserted into the lens holder 90, with pin 102 engaged in recess 104. In this position, each screw 106 will be aligned with a hole or opening 105 in lens holder 90. The knob 124 is rotated to focus the picture on the screen. When the picture is focused, one set screw or Allen screw 106 is tightened to lock the adapter 100 and lens 130 to one another. The lens 130 and adapter 100 are removed from holder 90 and the remaining screws 106 are anchored to the lens. The foregoing procedure can then be repeated with the wide screen lens and associated adapter, making certain that the knob 124 is not disturbed.

To switch from one lens and adapter to the other, loosen knob 108 and install the new adapter with pin 102 in slot 104. Then tighten knob 108. The new lens will be automatically in focus.

Turning to FIGS. 5, 6, 7, 8, 8a, 10, 11, and 13, there is better illustrated the film trap and film gate assembly which is shown circled and identified by the numeral 5 in FIG. 2. The assembly 48 is comprised essentially of a film trap having guide means thereon for supporting the film in a vertical path through the projector mechanism in a curved cross-section as viewed from above, the curvature being convex relative to the light source in the projector mechanism. The assembly also includes a film trap mechanism to retain the film properly within the guides.

Considering the detail aspects of the film trap and film gate assembly, the film trap is comprised of a film trap plate 140 having guide means suitably secured thereto. The guide means are comprised of film rails 142 and film guides 144 suitably secured to the film trap plate 140 by screw means 146. The inner edges of the film rails 142 are beveled as best seen in FIG. 13. The bevel helps to maintain the film with the proper curvature relative to the light source indicated by the arrow in FIG. 13.

There are two openings 148 and 149 provided in the film trap plate 140. A framing aperture plate 150 is secured over the opening 148 in the block 140 by means of a screw 151. An aperture plate 152 is adapted to be maintained in the recess 154 in the block or film trap plate 140. The elongated bolt 156 passes through an opening in the block 140 for securing same to the main frame 15.

Secured to the rear of the block 140 by suitable fastening means, for example, screws 159, is a gate cooling plate 160 which is made from a suitable metal, e.g., copper, and is connected to tubing conducting cooling medium to the plate 160 to cool same. The cooling medium may be air, but water is preferred. The gate cooling plate 160 has enlarged openings 162, 164 therein, which are in alignment with openings 148 and 149 in the block 140. Framing light means 165 comprising a bracket and bulb are secured rearwardly of the gate cooling plate 160.

Extending transversely from the block 140 in generally parallel relationship to one another are an upper film trap plate shaft 167 and a lower film trap plate shaft 168. The shafts 167, 168 are each secured at one end to the block 140. The film trap cover assembly or gate assembly is comprised of a film trap cover 170 carried on the pins 167 and 168. The pressure plate 172 engages along one edge in a milled recess in the film trap cover 170 and is secured in place to the film trap cover 170 by means of a lock screw 174. Pressure pad means are secured to the pressure plate 172. The pressure pad means comprise left and right pressure pads 176, 177 that are secured to pressure pad plates 178, 179. The pressure pad means are carried on the pressure plate 172 by means of identical spring loaded assemblies comprising a spring pressure cup washer 180, a conical compression spring 182, a pad spring adjusting nut 184, and a retaining screw 186.

Secured to a pin depending from a lower projection portion of the pressure plate 172 is an intermittent sprocket tension shoe arrangement 189 (or 189') which includes a shoe 188, a shoe plate 190, a spring pressure cup washer 192, a conical spring 194 and adjustment nut 196, and a retaining screw 198.

In FIG. 8a, there is illustrated an alternative inner intermittent sprocket tension shoe means 189' used in place of the tension shoe arrangement of FIG. 8 on projector mechanisms having reverse projection. These components comprise the intermittent sprocket tension shoe 200, sprocket shoe spring support 202, the intermittent shoe spring support retained in place by a construction including a washer spring adjustment nut and retainer as in FIG. 8. Similarly, there is shown a plate 190 beneath the intermittent sprocket tension shoe 200 which is retained in position by a like washer spring adjusting nut and retaining screw. Basically, the tension shoe 188 is comprised of like inner and outer shoe members 188a and 188b for engaging the film on opposite sides of the sprocket teeth. Shoe 200 substitutes elongated shoe members 220 for the inner shoe members 188a.

With reference to FIGS. 5 and 7, it will be observed that the film trap and film cover assembly 48 are easily removable as a unit. To remove the assembly 48 for cleaning, it is necessary only to loosen the screw 156 and pull the entire assembly forwardly from engagement with the frame 15. The film gate or film pressure plate 172 is readily removed either with the trap plate 140 anchored or free. To remove the pressure plate or gate 172 without removing the trap or block 140, slide film trap cover 170 forwardly with respect to trap plate or block 140, loosen the screw 174 and slide the gate 172 out, since the gate 172 is retained along one edge in a milled slot of the film trap cover 170. To replace the gate 172, position the gate or pressure plate 172 in the milled slot, with the opening 171 therein in alignment with the screw 174 and retighten the screw.

Another feature of this invention is the novel adjustment of the relationship of the film trap cover 170 with respect to the trap 140. Essentially, this adjustment can be made by inserting a screwdriver in the slot of the gate eccentric shaft or pin 204 and rotating same in order to change the relationship of the film trap cover 170 and gate 172 carried therewith relative to the trap or block 140. This change of relationship affects the pressure with which the gate may bear upon the film being passed through the guides of the trap. Detail of this relationship will be further explained hereafter. A spring loaded ball arrangement is provided in the film trap cover 170 in order to maintain the gate eccentric shaft 204 in desired adjusted position. Such arrangement includes a ball 206 adapted to contact a surface of the eccentric shaft 204, a spring 208 biasing the ball 206 and a set screw 210 engaging within the recess or opening 211 in the film trap cover 170.

In FIG. 9, there is illustrated another feature of the present invention, the ball bearing supported outboard intermittent sprocket shaft. The intermittent sprocket 62 is supported on the sprocket shaft 222 for rotation therewith and the sprocket shaft is supported by a roller bearing 224 carried in an outboard mounting bracket 226 affixed to the intermittent sprocket bearing arm 228 carried on the main frame 15. Secured to the main frame 15 on the side opposite the sprocket 62 is a base plate 230 and an intermittent cover 232. The intermittent sprocket shaft 222 is journalled within the intermittent sprocket shaft bushing 234 and is secured at an end in axially slidable and rotatably drivable relationship with a coupler mechanism 229, which is in turn slidably secured to and rotatable with the shaft 231. The ends 231a and 222a of the shafts 222 and 231 are helically splined and are in abutting relationship within the coupler mechanism 229.

The star 235, rotatable with the shaft 231, is operatively connected to the cam 236 secured to shaft member or cam shaft 238 which is journalled within the intermittent cam shaft bushing 237. Secured to the shaft 238 is a gear 239 which is retained in place on the shaft 238 by means of the nut 240 threaded to an end of the shaft. Gear 239 is in operative association with gear 447 on shaft 430 (FIG. 21). The cam shaft 238 is journalled in ball bearing 248 housed within the cam shaft bushing 250.

A flywheel 242 is mounted on the shaft 238 in such manner so as to provide for safety slippage if stressed. The means for permitting the slippage of the flywheel 242 on the shaft 238 is comprised of a plastic collar 246 and intermittent flywheel shaft cap 245 secured to the end of the shaft by means of a retaining set screw 243. The flywheel 242 (which is driven by the reversible drive motor in the projector mechanism through belt drive means) bears against a shoulder on shaft 238 and is normally rotatable with the shaft. If the driving friction applied through the members 245 and 246 to the flywheel 242 is overcome, then the flywheel 242 may slip relative to the cam shaft 238 to provide the desired safety.

Accurate positioning and retention of the star 235 within the intermittent cover 232 so as to provide desired driving cooperation between the cam 236 and the star 235 is provided by stop pin 256 threadedly positioned within a threaded opening in the intermittent cover 232 and retained in desired adjusted position by means of lock nut 258. The end of the stop pin 256 bears upon a ball 259 positioned within the star 235 so as to retain the star and the shaft 231 associated therewith from further movement to the left as viewed in FIG. 9. The adjustment screw 260 is threaded into an opening in the mounting bracket 226 and includes on its inner end an annular raised portion that bears upon the outer race of bearing 224. The bearing 224 journals shaft 222 and seats against a peripheral shoulder thereon. Rotating the screw 260 will thus remove end play from the entire intermittent sprocket shaft assembly comprised of the shafts 222 and 231. The sprocket 62 is held to the shaft 222 by suitable adjustable fastening means, for example, a bolt and nut engageable in a slot in the sprocket 62 to enable adjustment of the sprocket 62 axially along the shaft. It will be understood that the stop pin 256 and screw 260 are adjusted at the same time so as to properly position shafts 222 and 231.

Figure 20:
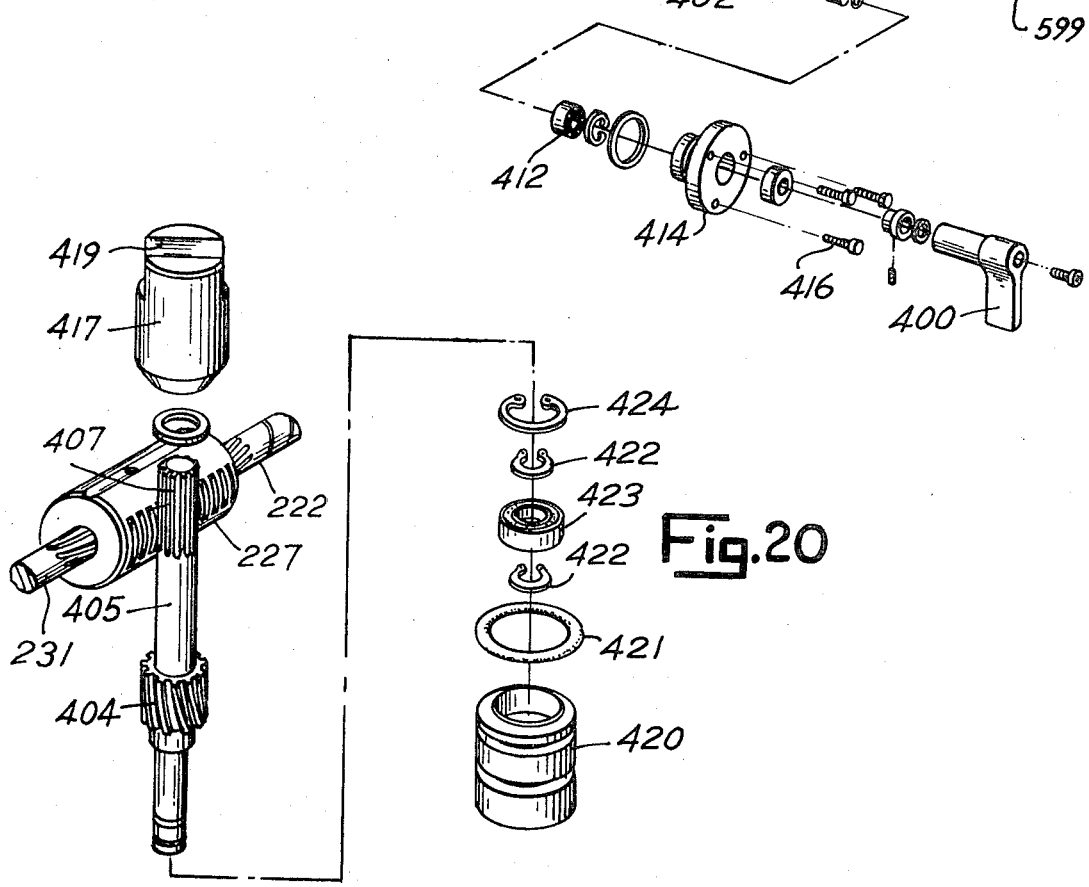
FIG. 20 is an exploded perspective view illustrating the vertical framing assembly of the projector mechanism.

The coupler mechanism 229 is within frame coupler housing 227. The exterior of the frame coupler housing 227 is formed on one side with rack teeth that are connected to the rack gear 407 on the shaft 405 (FIG. 20). The coupler mechanism 229 is provided with thrust bearings at its ends and is rotatable within the housing 227 and movable axially of the axis of shafts 222 and 231 with the housing 227. Through the action of the cam and star, the shafts 222 and 231 are rotated 90 degrees and stop so as to rotate sprocket 62 to index the film through the film trap and film gate assembly 48. The movement of the housing 227 axially of the shafts 222 and 231 (left or right as viewed in FIG. 9) will rotate the intermittent sprocket shaft 222 to accurately rotate and position the intermittent sprocket 62 secured to the shaft 222 to assure that each frame of the film will be precisely oriented relative to the aperture opening 164 and to the shutter timing. The spiral or helical splines are formed in the end of the shafts and are reversely disposed within the coupler mechanism 229 to multiply the rotational movement of the shaft 222 and sprocket 62 for a given force to move the housing 227. Since the shutter operation is timed with the intermittent sprocket movement, the film will be precisely framed and there will be no travel ghost viewed during projection of the film. In prior known constructions it was necessary to move the entire intermittent assembly in order to effect desired adjustment of the framing. The shutter was thrown out of synchronization. By virtue of the present construction, only the sprocket is rotated to obtain desired framing and shutter operation is not affected.

An advantage of the intermittent movement of the present invention is that no shutter compensation is required in order to effect adjustment of the intermittent shaft 222, as was necessary in prior constructions when the intermittent assembly was adjusted.

In FIGS. 10 and 11, there is better illustrated another feature of this invention, the runner to improve reverse operation of the projector and obviate the tendency of film to buckle between the sprocket 62 and the film trap and cover assembly 54. In order to prevent the film for buckling and pushing out between the intermittent shoe assembly 189 and the gate shoe or film pressure plate 172, a runner 220 made from a suitable plastic is mounted inside of the outer intermittent shoe 188 of the intermittent shoe assembly 189. The runner, which may be made from a suitable plastic, for example an acetal resin such as "Delrin," meets the film gate shoe 172 and thus provides a smooth transition to prevent buckling of the film during reverse operation.

The improved shutter and dowser mechanisms of the present invention are better illustrated in FIGS. 14, 15, 16, 17 and 18.

Figure 14:
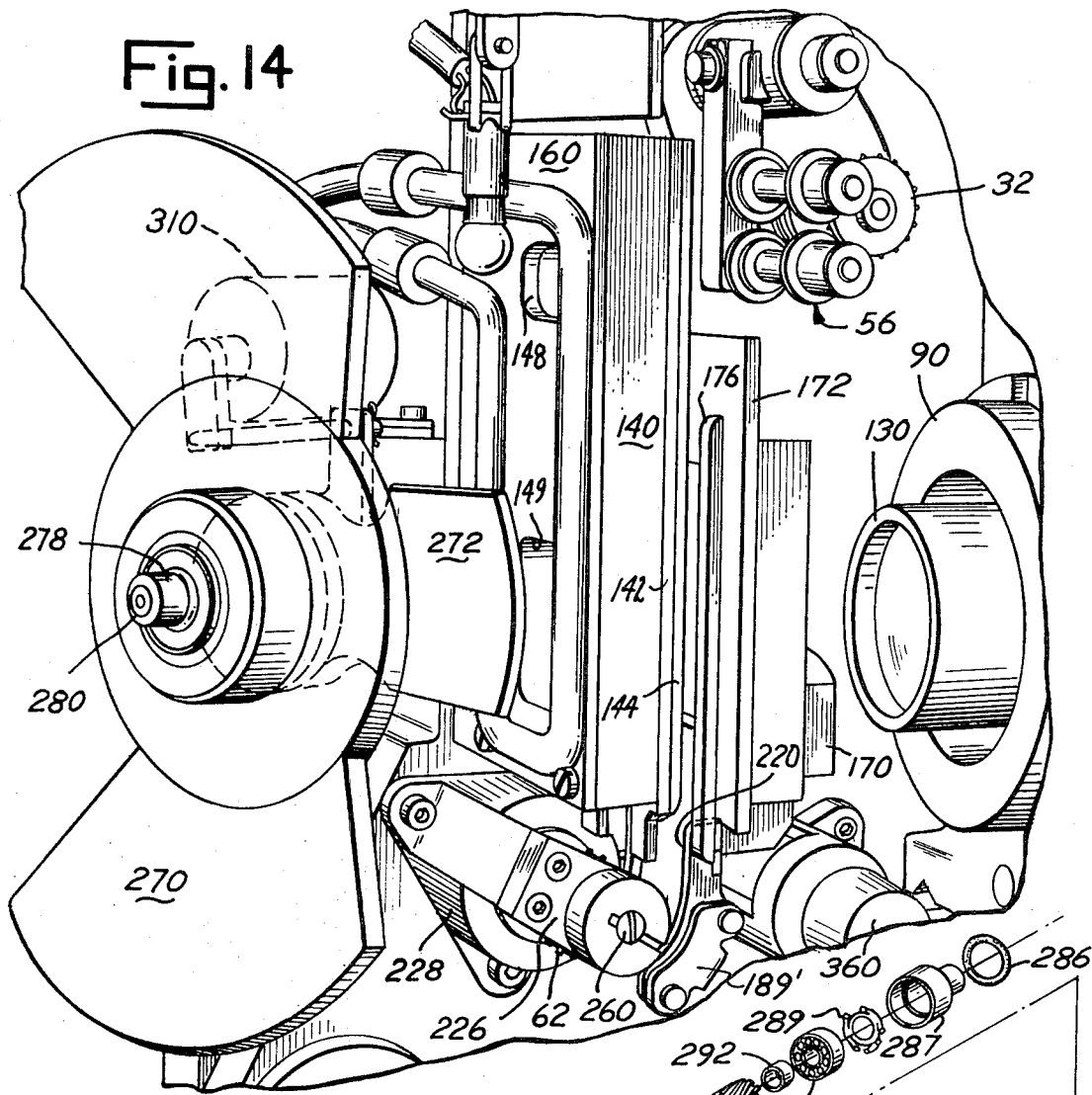
FIG. 14 is a rear perspective view of the projector mechanism illustrating the dowser and shutter members.

The shutter 270 and the dowser 272 are adapted to be mounted coaxially on the shutter shaft 274 and be journalled within the opening 276 in the main frame 15. As shown in FIG. 14, the dowser 272 is in a 3 o'clock position to interrupt the path of light from the source through the aligned openings 164 and 149 in the gate cooling plate 160 and block 140, respectively. The dowser 272 is movable from a 12 o'clock position to the 3 o'clock position during changeover, for example, from a first projector to a second projector. Its action is virtually instantaneous so that a viewer has no perceptible reaction that the first reel on the first projector is being completed and that operation of the second reel on the second projector is being initiated. By use of the dowser, it is unnecessary to terminate the light from the light source which would result in a more perceptible changeover to the viewer of the motion picture.

A feature of the shutter 270 is that it is mounted on its shaft 274 so as to slip relative thereto in the event an operator should accidentally contact the shutter or in the event that an obstruction should find its way into contact with the shutter 270. At times, the operator may attempt to clean the projector during its operation by removing the safety cover. There is danger that he might hurt his hand by contact with the shutter or that he might damage the equipment by introducing a cloth or like cleaning member into contact with the shutter 270. By virtue of the slip-type clutch connection of the shutter 270 to the shutter shaft 274, damage to either the operator or the equipment is obviated.

Figure 16:
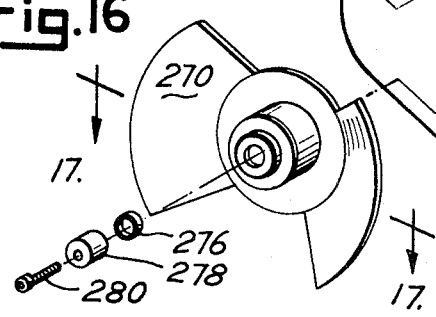
FIG. 16 is an exploded perspective view illustrating the clutch connection for the shutter.
Figure 17:
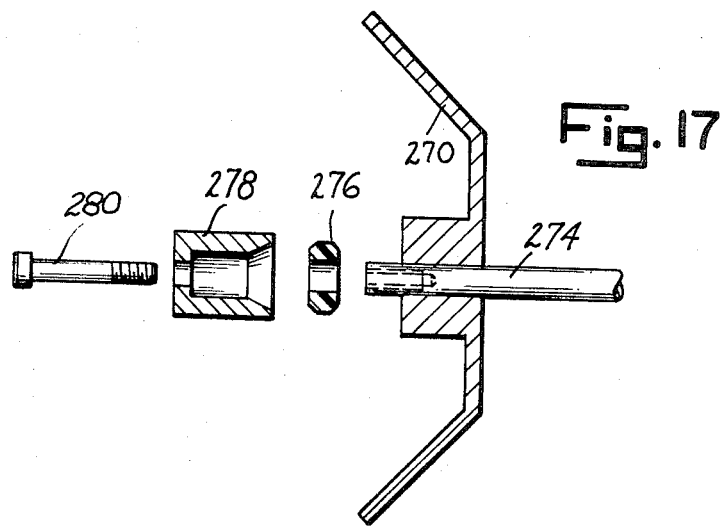
FIG. 17 is an exploded cross-section view of the shutter.

As indicated from FIGS. 16 and 17, for example, the shutter 270, which takes the form of a hub having blades spaced outwardly therefrom, is disposed on the shaft 274. A washer 276, which may be made from nylon or like plastic material, is positioned over the shaft 274 adjacent the hub portion of the shutter means or shutter blade 270, shaft cap 278 is secured over the shaft end and retaining screw 280 is threaded into an opening in shaft 274 and tightened in order to secure the components in assembled relationship on the shaft end.

Figure 15:
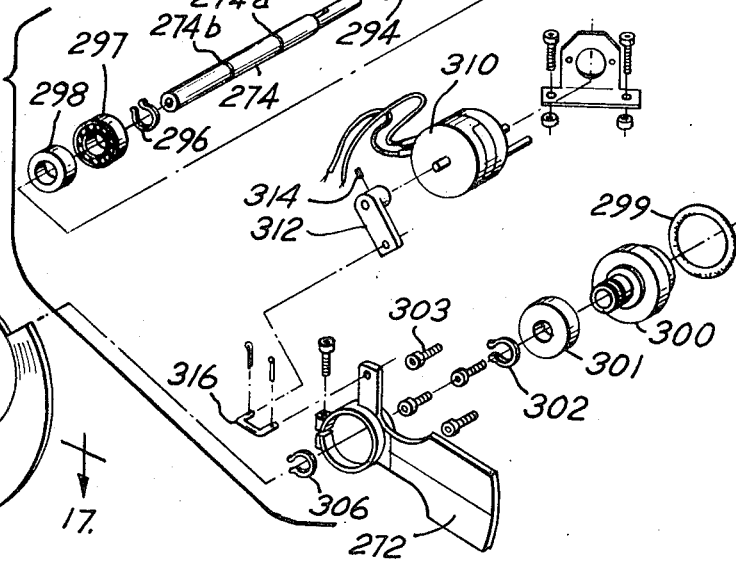
FIG. 15 is an exploded perspective view of the dowser.

Considering FIGS. 15 and 21 in further detail, it will be noted that the shutter shaft assembly includes gasket 286, shutter shaft back eccentric bushing 287, a pressure washer 289, bearing 290, shutter shaft spacer 292, shutter shaft gear 294 keyed to the shutter shaft 274, retaining ring 296, bearing 297, oil seal 298, gasket 299, the shutter shaft cap 300, bushing 301, retaining ring 302 for securing the bearing 301 in position on the shutter shaft cap 300, screws 303 for engaging within the tapped openings 304 in the rear of the main frame 15 to connect the shaft cap 300 to the main frame 15 and retaining ring 306. Gear 294 is keyed to shaft 274 which is then inserted into the entry opening 305 in the rear of the main frame. The gasket 286 is positioned on the bushing 287 and washer 289 and bearing 290 are positioned in the bushing 287, which is then slipped over shaft 274. Spacer 292 is positioned on the shaft 274 and the components are locked in place by C-ring or retaining ring 296, that engages in recess 274a in shaft 274. The bearing 297, oil seal 298, gasket 299 and cap 300 are positioned on shaft 274. Bearing 301 engages on a peripheral surface of the cap 300 and is retained thereon by retaining ring 302. Dowser 272 is positioned on bearing 301 and connected thereto by suitable fastening means, for example, a cap screw that clamps the dowser collar to the bearing 301. Retaining ring 306 is placed in recess 274b in shaft 274. The shutter blade 270 is then positioned on shaft 274. Washer 276 goes over the shaft end. Retaining screw 280 is passed through shaft cap 278 and secured to the threaded opening in the end of the shaft 274. A solenoid mechanism 310 is connected to main frame 15 by suitable fastening means. An arm 312 is operatively connected to the solenoid shaft by suitable means, for example, a set screw 314. Connecting pin 316 operatively connects the solenoid connecting arm 312 to the upstanding arm on the dowser blade 272. The dowser blade 272 is opened by action of the rotary solenoid 310 and is held open by current being on in the rotary solenoid during operation (The 12 o'clock position is the open position). When current is turned off, the dowser blade 272 closes by its own weight and the spring action of the solenoid 310 or stated another way, is moved to the 3 o'clock position. The present construction is accurate in operation and represents simplification of prior constructions wherein a double solenoid coil was used to position the dowser blade. In such prior constructions, momentary current to one end of the solenoid opened the blade and momentary current to the other solenoid closed the blade.

Figure 18:
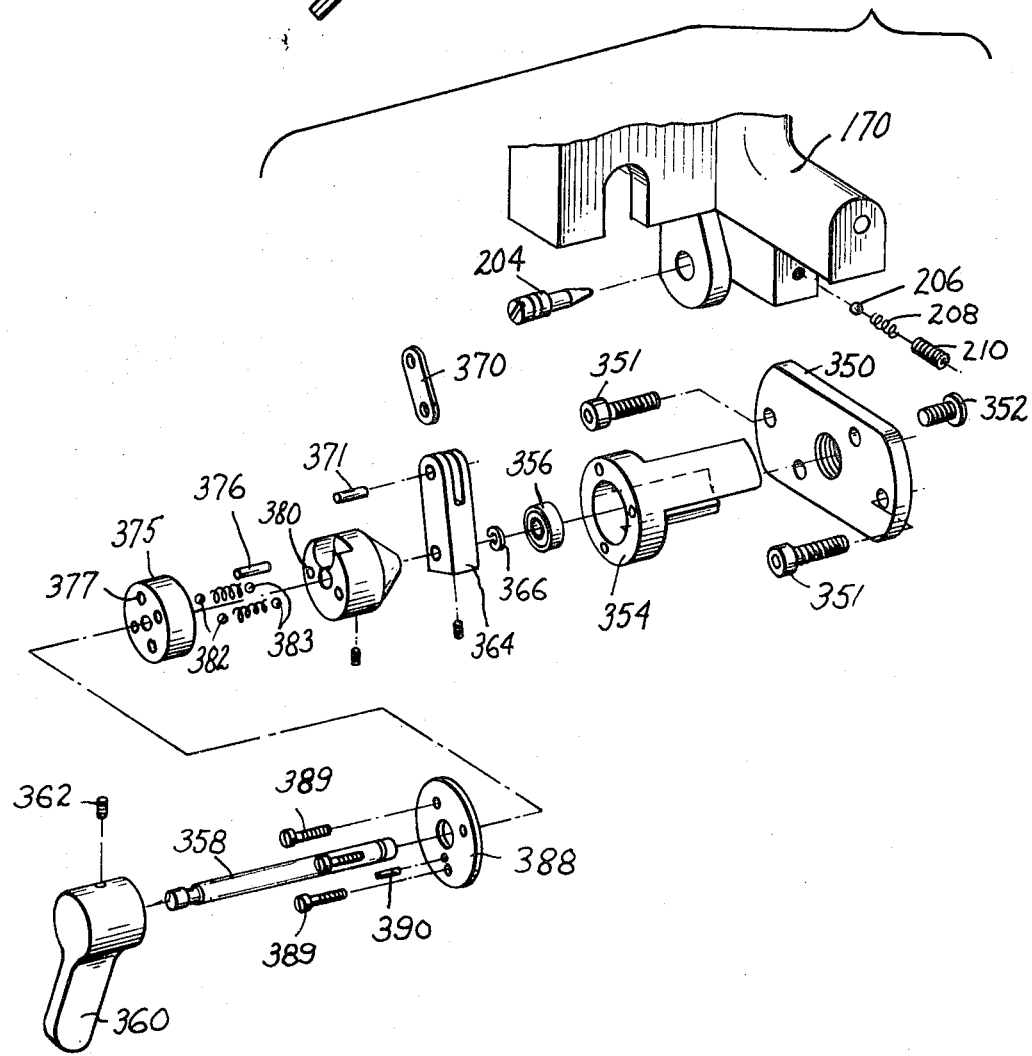
FIG. 18 is an exploded perspective view illustrating the detent mounting assembly.

With reference to FIG. 18, there is better illustrated the detent mounting assembly which comprises another feature of this invention. This construction might best be explained by comparing it to an arm for holding a lid on a chest or a desk open. A centrally hinged arm is provided connecting the lid to the chest or desk. When the lid is opened, the hinged arm passes over center and the lid cannot be closed until the arm passes overcenter in an opposite direction. The detent mounting assembly of this invention is somewhat analogous to such arrangement. The detent mounting assembly is comprised of a detent mount plate 350 adapted to be connected to the main frame 15 by suitable bolt means 351. Secured to the detent mount plate 350 by suitable means, as for example cap screws 252, is a detent mount 354. Bearing 356 is carried within a recess in the detent mount plate 350 for journalling an end of the shaft 358, which may be actuated by the lever 360 adapted to be secured to the end thereof and fixed in place by suitable fastening means, for example a set screw 362. Disposed on the shaft 358 between the collar portion of detent mount 354 and plate 350 is a push-pull arm 364. The push-pull arm 364 is adapted to be operatively connected to the eccentric shaft or pin 204 by means of the film trap linkage arm 370 which is secured on the eccentric shaft 204 at one end and affixed to the push-pull arm 364 at its other end by a suitable retaining member, for example pin 371. The idler detent mating stud 372 lies within mount 354 and abuts a side of the push-pull arm 364. Carried on the shaft 358 in spaced relationship to the idler detent mating stud 372 within the mount 354 is a film trap detent stud 375 operatively connected to the idler detent mating stud 372 by means of a pin 376 secured to the opening 377 in the film trap detent stud 375 and operatively associated with the recess within the idler detent mating stud 372. Disposed between the idler detent mating stud 372 and the film trap detent stud 375 are ball bearings 382 adapted to fit in cooperating recesses (not shown) in the face of the film trap detent stud 375. The spring 384 and ball bearings 383 are positioned in openings 380 in idler detent mating stud 372. The ball bearings 382 are biased into the hemispherical recesses in the member 375 by means of springs 384.

Mount washer 388 is adapted to be connected to the detent mount 354 by means of screws 389 to maintain the components in assembled relationship. It will be noted that the film trap detent stud 275 is maintained against rotation by means of the roll pin 390 which extends through an opening in the mount washer 388 into an aligned opening in the film trap detent stud 375. Retaining ring 366 engages in a recess in the shaft 358 to hold same in place.

In operation, the outer two ball bearings 382 fit into the recesses in the surface of the member 375. When lever 360 is rotated, the assembly detents in the closed position of arm 364, throwing it slightly off-center with respect to the film trap linkage arm 370. This makes it impossible to get any vibration in the film gate or film trap cover 170. Therefore, the shoes are perfectly aligned with the trap 140 and the gate position eccentric shaft or pin 204 can be changed without any movement whatsoever in the detent mechanism. Operation is perfectly smooth in reversing the lever 360.

Figure 19:
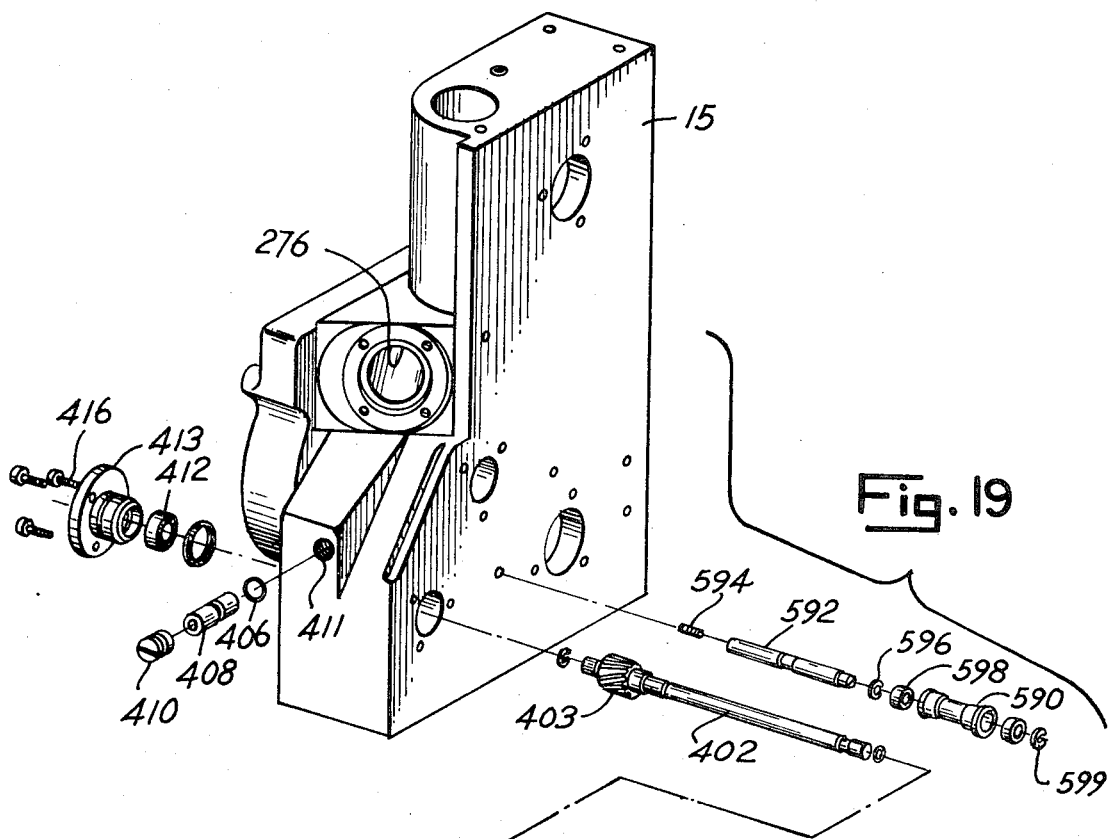
FIG. 19 is an exploded perspective view illustrating the horizontal framing assembly and the intermittent film guide roller.

Turning now to FIGS. 19, 20 and 21, there is better illustrated the horizontal and vertical framing features of the present invention. The projector mechanism 14 is framed by rotating the lever 400 that is operatively connected to the horizontal framing shaft 402 which has secured thereon a gear 403 that meshes with the gear 404 on the vertical shaft 405. Rotation of the vertical shaft 405 (FIG. 20) will cause the rack gear 407 to move the housing member 227 (FIG. 9) in the intermittent movement so as to provide proper framing of the projector mechanism.

An important feature is the provision of friction means to retain the vertical shaft 405 against accidental movement to upset the framing of the projector mechanism 14. An O-ring 406 is disposed about a tension plug 408 which might be made from nylon or the like. The tension plug 408 is urged inwardly into engagement with the shaft 405 by means of the adjustment screw 410, which engages within the opening 411 in the main frame 15. The horizontal framing shaft 402 is journalled and retained within the main frame 15 by suitable means including ball bearings 412 and framing shaft caps 413 and 414 which are secured on opposite sides of the main frame by suitable cap screws 416.

By virtue of the bearing of the friction means comprising the parts 406, 408, and 410 bearing against the vertical shaft 405, the projector cannot accidentally move out of frame. The pressure from the tension plug 408 puts pressure on the rack gear 407 formed integrally on shaft 405 which in turn increases or decreases tension with its mating rack gear formed on housing 227 in the intermittent movement.

With reference to FIG. 20, other components of the vertical framing assembly include the framing shaft cap 420, an O-ring 421 carried on the shaft cap 420, retaining rings 422 for securing the bearing 423 in place on the shaft 405 within the cap 420 and retaining ring 424 which holds the bearing 423 in cap 420. A set screw passes through main frame 15 to engage in recess 420a to hold the cap 420 in place.

Now turning to FIG. 20a, there is better illustrated the cooperative relationship between the vertical framing shaft, the intermittent movement and the friction means for retaining the vertical shaft in adjusting position. As seen in FIG. 20a, the axis of tension plug 408 is substantially at right angles to the axis of the housing 227 and the shafts 222 and 231 (FIG. 9). Thus, the tension plug 408 applies a pressure to the shaft 405 so as to firmly urge the teeth of rack gear 407 into engagement with the cooperating teeth of the rack formed on the exterior of housing 227. The end of the tension plug 408 engages within the recess 419 in the support bearing 417, and is urged inwardly against the shaft 405 in response to rotation of the adjustment screw 410. This also urges the shaft 405 against housing 227 to hold the housing 227 in fixed position in its bore in the main frame 15.

FIG. 20a shows the assembled relationship between the components shown in exploded perspective view in FIG. 20. It will be understood that the cap 420 is retained in position by a set screw passing through a suitable opening in the main frame 15 into engagement with the annular recess 420a in the cap 420.

Referring to FIGS. 2 and 19, there is illustrated the intermittent film guide roller 590. The intermittent film guide roller 590 is rotatably supported on shaft 592 secured to the main frame 15 to assist in guiding film between the sprocket 62 and shoe 189 when the projector is running in reverse. In reverse operation, film passes from sprocket 68 over the top of sprocket 590 and then enters between the sprocket 62 and shoe 189 in substantially a horizontal plane. Referring to FIG. 19, it is noted that stud 594 is secured in a threaded opening in main frame 15. Shaft 592 is threadingly connected to stud 594. A first retaining ring 596 is secured in a recess in the shaft 592. Bearings 598 are inserted into the recesses in the ends of the roller 590 and assembled on the shaft 592. Retaining ring 599 engages in the outer annular recess in shaft 592 to lock the components onto shaft 592.

As best shown in FIG. 21, the vertical shaft 430 is journalled in bearings 431 and 432 supported within the vertical shaft caps 434 and 436. O-rings 438 and 439 are provided on each of the shaft caps to seal same with respect to the openings in the main frame 15. A pressure washer 440 is disposed between the end of the shaft 430 and the shaft cap 436. Retaining ring 442 is provided on the shaft to hold the parts in assembled relationship. Provided on the shaft 430 are gears 446, 447 and 448 which are adapted to cooperate with gears 465, 239 and 467. Gear 465 is on shaft 460 which drives the upper sprocket 32. Gear 467 is on the shaft 460, which drives the lower sprocket 68. Gear 239 is on shaft 238 in the intermittent movement and drives the intermittent movement and the shutter.

The shaft caps 434 and 436 are each provided with a slot 450 that is eccentric or off-center relative to the exposed surface of the caps 434 and 436. One edge of the slot 450 is almost to the edge of the exposed surface of the cap 434. The cap 436 has a similar screwdriver slot. When the projector is assembled, the horizontal gears can be meshed perfectly with the gears 446, 447 and 448 by merely turning the eccentric housings or shaft caps 434 and 436.

Another important feature of this invention is the use of double pad rollers in the horizontal upper and lower shaft assemblies that are adjustable both horizontally and vertically. In the past, pad rollers were mounted on an arm pivoted on a shaft. The pad rollers were pivoted toward and away from a sprocket to retain film thereon. An adjustment screw was provided to adjust the arm relative to the shaft and in adjustment the two pad rollers did not follow the same arc. The pad rollers of the present invention are constructed and arranged so that they can be put in perfect alignment with their associated sprockets. The upper and lower horizontal shafts 460 and 461 are adapted to be suitably journalled at one end in bearing members 463 and at the other end in bearing members 464. The upper horizontal drive shaft cap 466 is suitably secured to the main frame 15 to hold an end of the shaft 460 in place. Similarly, the lower horizontal drive shaft cap 468 is affixed to the main frame 15 to support an end of the shaft 461. The timing belt drive 470 is affixed to an end of the shaft 461 by suitable fastening means as, for example, a set screw 471. The bearing 464 is disposed within the upper horizontal shaft and pad roller housing 472 that is secured to a face of the main frame by means of suitable fastening means, for example cap screws 474. Sprocket 32 is suitably secured to the end of the shaft 460. The right end of the shaft 461 is connected to a similar fashion as the shaft 460. The lower horizontal shaft and pad roller housing 478 retains the bearing 464 which journals the shaft 461. The housing 478 is suitably affixed to the main frame by fastening means 479. Sprocket 68 is suitably connected to an end of the shaft 461 so as to be driven thereby.

The double pad rollers associated with each of the sprockets 32 and 68 are of identical construction and accordingly, the components associated with the sprocket 32 will be described in detail and the like components associated with the sprocket 68 will be identified with the like numerals. Idler detent 482 is retained within a recess in the upper housing 472 by means of cap screws 484. An idler detent dowel pin 486 extends into the housing 472 for presetting the position of the idler detent relative to the housing. The pad roller arm shaft 488 is connected at one end to the housing 472, the other end of the shaft passes through the upper pad roller arm 490 which has the bearing 492 therein and is secured at its end to a knurled collar 494. Provided between the adjacent faces of the idler detent 482 and the upper pad roller arm 490 are balls 496 (spring loaded by springs 498) that are adapted to be seated in the hemispherical recesses on the face of the idler detent 482.

The upper roller arm extension 500 is adjustably secured to the upper pad roller arm 490 by means of the fastening means 501 extending into a slotted opening in the upper roller arm extension. Pad roller shafts 502 and 504 are affixed at one end to the roller arm extension 500. The pad rollers 506 and 508 are suitably journalled upon the shafts 502 and 504 and held in place by the knurled collars 510 secured to the end of the shafts 502, 504.

The idler detent 482 fits into a recessed opening or hole in the upper horizontal shaft and pad roller housing 472. There are two flat spots on the idler detent 482. By turning the cap screws 484 in opposite directions, the idler detent 482 is rotated within its housing. The idler detent 482 can also be moved inwardly and outwardly within the recessed opening in the housing 572 so as to put the double pad rollers 506 and 508 carried therewith into alignment with the associated sprocket 32.

With reference to FIGS. 22 and 23, there is illustrated another feature of the present invention. The reel hold-back clutch assembly shown in FIG. 22 and the lower take-up assembly shown in FIG. 23 are each provided with novel adjustment means that permit adjustment during operation. In prior like constructions, it was necessary to lock a nut into adjustment during a non-operating time. The shaft 530 is adapted to be journalled within the upper reel arm 24. The reel 18, for example, may be slipped over the lock member 532 and then locked into place over the key 534 so as to be rotatable together with the shaft 530. The shaft 530 is journalled in the bearings 536 carried within the upper reel hold-back clutch 538. Reel shaft collar 531 is secured to shaft 530 in abutting relationship to inner bearing 536. Retaining ring 537 holds the outer bearing 536 in place. The upper friction disc 540 is disposed on the shaft 530 and is adapted to cooperate with an adjacent face of the clutch 538. The friction disc 540 is adapted to be keyed to the shaft 530 for rotation therewith by means of the key 542. Adjustment of the friction between the cooperating faces of members 538 and 540 may be accomplished by rotating the take-up tension knob 544 on the threaded end of the shaft 530 in order to adjust the compression of the spring 546 which bears between the take-up tension knob 544 and the friction disc 540. Relative slippage between the members 538 and 540 will compensate for difference in effective reel diameter as the film is removed from the reel 18.

With reference to FIG. 23, there is shown the lower take-up assembly which incorporates a clutch adjustment like that of FIG. 22 for the reel holdback clutch assembly. To orient the shaft 550 relative to the projector mechanism, it will be noted that the shaft is journalled in the lower magazine and supports the reel 20 thereon. The reel 20 may be slipped over the reel lock mechanism 552 which is then pivoted relative to an end of the shaft 550 to secure the reel in place in locked engagement with the key 554. The shaft 550 will be journalled in the bearings 556, 557 that are retained in the take-up arm bushing 560 and the V-belt take-up pulley 562, respectively. The bolt means 564 are provided to secure the take-up arm bushing 560 within the magazine so as to properly support the shaft 550. With reference to FIG. 22, it is noted that the bolts 541 perform a similar function in that they secure the bushing 539 to the upper reel arm 24 so as to rotatably support a reel on the upper reel arm. Mounted on the shaft 550 for cooperative relationship with one another are a V-belt take-up pulley 562 and the friction disc 570. The friction disc is secured to the shaft 550 for rotation therewith by suitable fastening means, for example, set screw 571. It will be understood that the V-belt take-up pulley 562 may rotate freely on the shaft unless it is in driving engagement with the friction disc 570. The V-belt take-up pulley 562 is operatively connected to the drive motor 26 for effecting rotation of shaft 550 to wind film onto reel 20.

The tension between the pulley 562 and the friction plate 570 is adjusted in a manner essentially the same as the adjustment provided between the upper reel hold-back clutch 538 and upper friction disc 540 (FIG. 22). The spring 574 is disposed between a take-up spring bushing 575 on the shaft 550 and a take-up tension knob 576, which is secured with the threaded end of the shaft 550 and rotatable thereon in order to adjust the spring tension. The slippage between the pulley and friction plate compensates for the difference in effective film diameter on the reel.

Another feature of this invention is the provision on the face of the friction disc of a plurality of discs 580 made from a suitable plastic material as, for example, "Delrin." Whereas, it was known in the art to utilize a leather disc, a fiber disc or a felt disc on the face of the friction disc 570 to engage with the clutch, it was found that there was sometimes insufficient wiping or dragging effect. The separate discs 580 of the present invention improve the friction when coupled with the novel adjustment means and thus overcome the very large difference in tension between an empty reel and a full reel, which difference results in large difference in film speed. For example, the magnitude of the difference will be appreciated when it is considered that the effective diameter of a full reel of film is on the order of 26 inches, whereas the effective diameter of an empty reel is about 5 inches. The difference in speed with which the reels must operate on the large diameter difference is a problem in other constructions which is adequately solved in the present invention.

There has been provided by the present invention a novel projector mechanism containing substantially fewer parts than prior commercial professional projectors. The projector mechanism incorporates a 1/15 horsepower motor capable of adequately driving the sound mechanism and also providing for reverse drive so as to rewind the film. The motor may be operated manually or automatically, as desired.

Incorporated within the projector mechanism is a novel film gate and film trap assembly wherein the film is held in predetermined curved relationship convex to the source of light so as to match the curve of the screen. The intermittent sprocket shaft is ball bearing supported outboard from the main frame. The lens holder is designed to accept lenses of different diameter, for example, the conventional 4 inch diameter and 2 and 25/30 inch diameter lenses, with complete prefocusing of the lens and adapter so as to provide for rapidity in changeover where necessary. The flywheel on the intermittent drive is slip-coupled to the shaft so as to provide for safety slippage if stressed, for example, if a cleaning cloth should be engaged with the flywheel. The shutter is similarly mounted slip-coupled on its drive shaft to provide for safety.

The projector mechanism is built for automation and is designed to fit a wide variety of systems. It is compatible with existing sound mechanisms.

While we have described a presently preferred embodiment of the present invention, it will be understood that our invention is not limited thereto, since it may be otherwise embodied within the scope of the following claims.

We claim:
1. In a projector mechanism, an improved lens mounting assembly comprising:
  a lens holder having an opening therein and having a substantially flat, first surface which has a slot formed therein, with the longitudinal axis of said slot being parallel to the longitudinal axis of said lens holder opening;
  a mount arm adapted to be secured to a projector mechanism, the mount arm having a substantially flat, first surface which has a slot formed therein;
  means for mounting the lens holder on the mount arm so that said first surface of the lens holder is adjacent to said first surface of the mount arm, so that said axes of said slots in the first surfaces of the lens holder and mount arm are parallel and so that said slots in the lens holder and mount arm overlie each other;
  pin means positioned within said slots of the lens holder and the mount arm and between said first surfaces of the mount arm and the lens holder;
  means for reciprocally moving the lens holder relative to the mount arm in a direction parallel to said axis of the lens holder opening;
  a lens adapter adapted to receive and support a lens for use with the projector mechanism;
  complementary retention means for detachably retaining the lens adapter in said lens holder opening in a predetermined angular and longitudinal position, with respect to said axis of said lens holder opening; and
  means for locking the lens in a predetermined position in the lens adapter, the locking means being coordinated with the complementary retention means so that the lens can be placed in the lens adapter and lens holder in a prefocused condition and without necessity of additional focusing adjustment.

2. A projector mechanism as in claim 1 wherein said slots comprise V-slots in the lens holder and mount arm.

3. A projector mechanism as in claim 1 wherein the complementary retention means comprise a pin on the lens adapter engaged within a recess in the lens holder.

4. A projector mechanism as in claim 3 wherein the complementary retention means include clamping means for holding the pin in the recess.

* * * * *